United States Patent
Alkins et al.

(10) Patent No.: US 8,549,487 B2
(45) Date of Patent: Oct. 1, 2013

(54) AUTOMATED IDENTIFICATION OF REDUNDANT METHOD CALLS

(75) Inventors: Mark Andrew Alkins, Durham, NC (US); Denny Pichardo, Raleigh, NC (US); Martin Joseph Clayton Presler-Marshall, Chapel Hill, NC (US); Hunter K. Presnall, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 12/260,243

(22) Filed: Oct. 29, 2008

(65) Prior Publication Data

US 2010/0107144 A1  Apr. 29, 2010

(51) Int. Cl.
*G06F 9/44* (2006.01)
(52) U.S. Cl.
USPC .......................... 717/128; 717/151; 717/154
(58) Field of Classification Search
None
See application file for complete search history.

(56) References Cited

U.S. PATENT DOCUMENTS

| | | | | |
|---|---|---|---|---|
| 6,993,754 | B2 * | 1/2006 | Freudenberger et al. | 717/153 |
| 7,093,241 | B2 * | 8/2006 | Huang et al. | 717/153 |
| 2003/0093780 | A1 * | 5/2003 | Freudenberger et al. | 717/153 |
| 2003/0229887 | A1 * | 12/2003 | Hsieh et al. | 717/116 |
| 2005/0204349 | A1 * | 9/2005 | Lewis et al. | 717/162 |
| 2007/0150878 | A1 * | 6/2007 | Cates | 717/151 |
| 2007/0220515 | A1 * | 9/2007 | Dewitt et al. | 718/100 |

* cited by examiner

*Primary Examiner* — Matt Kim
*Assistant Examiner* — Hua Lu
(74) *Attorney, Agent, or Firm* — Jordan IP Law, LLC

(57) ABSTRACT

Detection of redundant or duplicate method calls in a running program is provided. One or more methods can be selectively called when a program is running. Specified data is collected each time that a call to a given one of the methods occurs, wherein a given call to the given method is associated with a set of arguments comprising one or more particular argument values for the given method. The collected data includes an element uniquely identifying each of the particular argument values. The collected data is stored at a selected location, and a call threshold is selected for the given method, wherein the call threshold comprises a specified number of occurrences of the given call to the given method. The collected data is selectively analyzed at the storage location, to determine whether an occurrence of the given call to the given method has exceeded the call threshold.

17 Claims, 3 Drawing Sheets

US 8,549,487 B2

AUTOMATED IDENTIFICATION OF REDUNDANT METHOD CALLS

BACKGROUND OF THE INVENTION

1. Field of the Invention

The invention claimed herein provides an automated process for detecting method calls in a running program that are redundant, in view of one or more previous method calls, and may therefore be unnecessary. More particularly, the invention pertains to a process of the above type that detects the number of times that a method having the same argument or arguments is called. Even more particularly, the invention pertains to a process of the above type wherein redundancies are detected by using hash codes or hash values to uniquely identify each particular argument of respective methods.

2. Description of the Related Art

A profiler is a performance analysis tool that measures behavior of a program as it is being run, such as the frequency and duration of methods, or functions, of the program. Herein, the terms "method" and "function" are used synonymously. At present, Java profilers may employ a call stack to view data that pertains to a running program. The call stack displays program methods in a tree or graph view, with nodes representing method calls. Data, such as cumulative execution time and CPU elapsed time, is typically presented for each method called.

A profiler tool of the above type and the capabilities it provides are useful for helping an analyst to discover opportunities to enhance program performance. However, such tools typically do not enable an analyst to discover calls to a method that are redundant, that is, that are duplicates of a previous call. To illustrate method call redundancy, an exemplary method Foo.mumble(x,y,z) is considered, wherein x, y, and z are the arguments or other parameters of this method. When its program is running, there is a first call to the method, wherein x, y, and z each has a particular value. If there is then a second call to the method, wherein the values of x, y, and z are each identical to their respective values for the first call, the second method call is a duplicate or redundant of the first call, unless there is some necessary intended reason for the identical second call. One such reason could be that the method call Foo.mumble(x,y,z) has side effects. A method or function produces a side effect if it modifies some state in addition to returning a value.

When a redundant or duplicate method call occurs in a running program, a task is performed that was performed previously by the first method call. Frequently, it happens that each of the duplicate calls is unnecessary, because the task only needed to be performed one time. As a simple illustrative example of this, a program executed to perform a number of operations on a table could call a method to paint the table, wherein the method has an argument that causes the table to be painted green. After this task has been completed, it would generally be a waste of time and resources to call the method a second time with the same argument, since this would cause the table to again be painted green. Moreover, redundant method calls that are not necessary uselessly add to the expense of a method, such as by increasing time requirements and/or by consuming memory and CPU capacity. However, typical profilers generally do not capture method arguments, nor do they provide a way to search for redundant calls.

BRIEF SUMMARY OF THE INVENTION

Embodiments of the invention use an automated procedure or means to efficiently identify the occurrence of redundant or duplicate method calls in a running program. Software developers may then be notified of the redundant calls, so that they can determine the cause of the redundancy and correct the redundancy if necessary. One embodiment, directed to a process or inventive method, is associated with a program disposed to run on a data processing system, wherein the program is provided with one or more methods that can be selectively called when the program is running. The process includes the step of collecting specified data each time that a call to a given one of the methods occurs, wherein a given call to the given method is associated with a set of arguments comprising one or more particular argument values for the given method, and the collected data includes an element uniquely identifying each of the particular argument values. The process further includes storing the collected data at a selected location, and selecting a call threshold for the given method, wherein the call threshold comprises a specified number of occurrences of the given call to the given method, when the program is running. The collected data is selectively analyzed at the storage location, to determine whether an occurrence of the given call to the given method has exceeded the call threshold.

BRIEF DESCRIPTION OF THE SEVERAL VIEWS OF THE DRAWINGS

FIG. 5 is a block diagram showing a computer or data processing system that may be used in implementing embodiments of the invention.

DETAILED DESCRIPTION OF THE INVENTION

Figure 1:
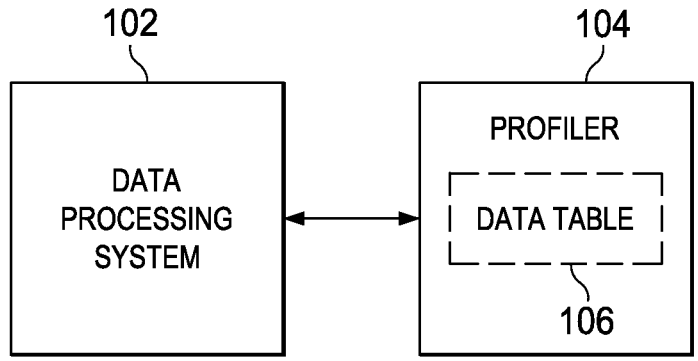
FIG. 1 is a schematic diagram depicting a configuration of components for implementing an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As described above, the call to a method that has the same arguments as a previous call to that method is generally an unnecessary duplicate or redundant call, unless the method has side effects. As likewise described above, redundant calls tend to waste resources, including computer resources. For example, if a method takes a comparatively long time to complete each time that it is called, unnecessary duplicate calls to the method could waste substantial amounts of time, and are thus clearly undesirable. Accordingly, embodiments of the invention provide an efficient automated approach for detecting one or more calls to a method that are redundant. Redundant calls can then be investigated or analyzed further, and corrective action may be taken as necessary.

Referring to FIG. 1, there is shown a simplified configuration of components for use in implementing an embodiment of the invention, wherein the configuration includes a data processing system 102 and a profiler or profiling tool 104. As a program is running on system 102, one or more methods are successively called. Each time a particular method is called, profiler 104 enters the method in the sense that the profiler is operated to collect or acquire data regarding the called method, before the method is executed. The collected data in particular pertains to the arguments of the method that has been called, as described hereinafter in further detail. Usefully, such data is collected at the same time that profiler 104 is collecting other metrics that are generally captured from a called method by a conventional profiler. Also, the collected data is selectively placed and arranged by the profiler in a data table 106, which is usefully located within the profiler.

While FIG. 1 shows data processing system 102 and profiler 104 as separate components, for purposes of illustration, it will be appreciated that profiler 104 and data table 106 could instead be included in data processing system 102 as integral components thereof.

Figure 2:
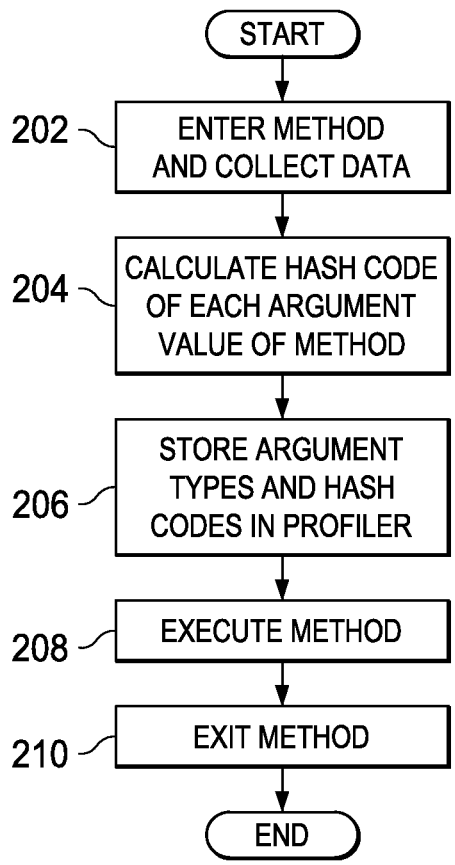
FIG. 2 is a flowchart depicting steps for collecting data in accordance with an embodiment of the invention.

Referring to FIG. 2, there are shown steps of a procedure whereby a profiler 104 or the like collects data in accordance with an embodiment of the invention. After a method is called, the profiler enters the method and collects or acquires data therefrom at step 202. More particularly, the profiler recognizes that the method has one or more arguments or other parameters, and collects data that identifies the type of each argument. Argument types could include, for example, strings, objects, or integers. Moreover, the profiler collects the specific values of respective arguments.

Referring further to FIG. 2, at step 204 a hash code or hash value is computed, for each method argument value collected at step 202. As is well known, a hash code, hash value, or hash function is a mathematical function or other well defined procedure for using data of some type, such as an argument value or values, to derive a comparatively small integer that uniquely represents the data. At step 206, the hash code for each argument value, and also each argument type, are stored or placed into data table 106 of profiler 104 in FIG. 1. The method is then executed by data processing system 102, as indicated by step 208. The profiler exits the method at step 210 and the process of FIG. 2 ends.

Figure 3:
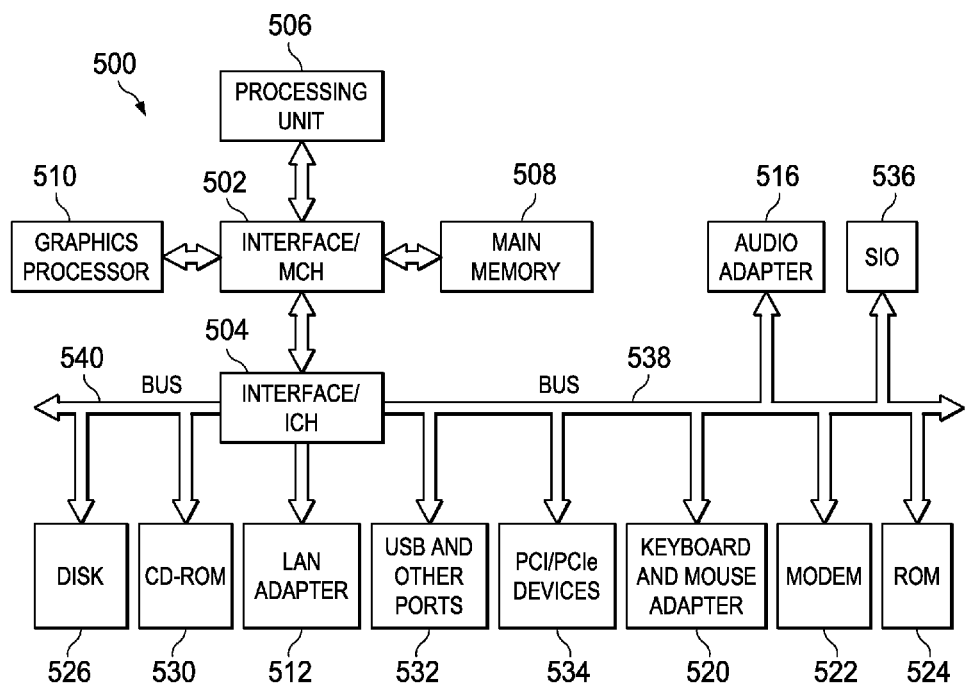
FIG. 3 is a schematic diagram showing a data table that contains collected data of FIG. 2.

Referring to FIG. 3, there is shown data table 106 provided with data elements that are respectively ordered or arranged in columns 302-308. Respective elements are collected and derived by activities, such as those of steps 202 and 204 of FIG. 2, and are then placed or inserted into table 106. Column 302 shows the class of each method that is processed by the procedure of FIG. 2 or the like, and column 304 contains the name of each such method. For purposes of illustration, column 304 shows only two methods to which calls are made, one method named Method A and the other name Method B. Both of these methods are included in a Class A.

Column 306 of FIG. 3 shows the argument types of respective arguments, and indicates that the argument types could include mathematical integers (int), objects, and/or strings, wherein a string is a data type that stores a sequence of data. At column 308, a hash code, or hash value or hash function, is derived for the value of each argument of each of the methods contained in table 106. As described above, each hash code or hash value comprises a relatively small integer that uniquely represents and identifies its corresponding argument.

Figure 4:
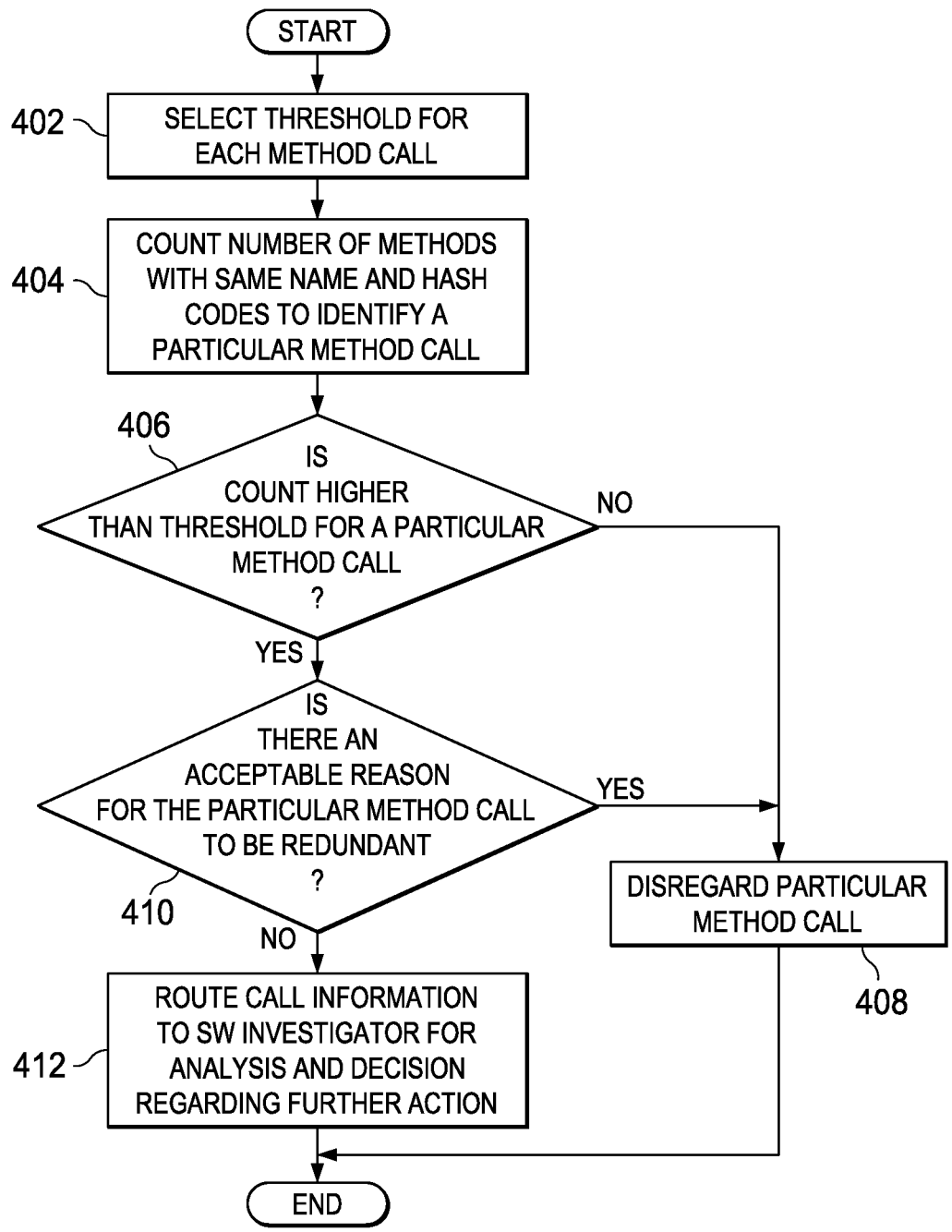
FIG. 4 is a flowchart showing steps for detecting a possible redundant method call in accordance with an embodiment of the invention.

Referring to FIG. 4, there is shown a flowchart depicting steps of a procedure for detecting redundant or duplicate calls to a method. At step 402, a threshold is selected for each particular call to a method, wherein the threshold is the number of times that the particular method call can occur without being considered redundant. Thus, the occurrence of a particular method call that exceeds the threshold therefor will be treated as a redundant or duplicate call. For example, the data table 106 of FIG. 3 shows that four calls to a Method B all have the same argument type, i.e., string, object [ ], and the same set of argument hash values, i.e., 2, [1, 2, 3]. Thus, if the threshold of this method call was selected to be 3, such call would be a redundant method call.

In selecting the method call threshold of step 402, there may be different considerations for different method calls. For some of the method calls, a single duplicate call could be excessive and the threshold thereof would be set at 1. For other method calls, a small number of duplicates could be acceptable and the threshold could be selected to be 2 or 3.

For yet other method calls, it may be important to consider how expensive a method is in terms of its execution time. As an example, if a method takes two seconds to execute, and the method is being called more than three times with duplicate arguments each time that the program is run, the reason for the duplicate calls may need to be investigated. Thus, the threshold for this method call would be set to 3. If the execution time of a method is sufficiently long, even a single duplicate call could be undesirable, and the threshold would be selected to be 1.

Alternatively, the expense of calling a method could be considered in terms of metrics such as the CPU and/or memory capacity needed to execute the method. Method calls with high capacity requirements could be assigned low thresholds, so that redundant calls would be readily detected.

Step 404 of the procedure of FIG. 4 is carried out in connection with data, such as the data contained in table 106. As described above, the data for a method call includes the name of the method, and further includes a hash code or hash value that uniquely identifies each argument value of the call. All of the hash codes derived for a method call collectively comprise a hash code set. Accordingly, the task of step 404 is usefully performed by counting the number of entries, such as in a data table 106 or the like, that all have the same method name, and that also have identical hash code sets. Each of these entries would thus identify the same method call, and the number of entries counted would indicate the number of times that the method call has occurred, while the program is being run.

At step 406, the count number for a particular method call is compared with the selected threshold for that method call. If the count does not exceed the threshold, the call is disregarded as shown by step 408, and the procedure of FIG. 4 ends. Otherwise, it is necessary to determine whether there is an acceptable reason for the particular method call to be redundant, as indicated by step 410. As described above, a redundant method call could be acceptable if it had side effects. Another example of a reason for accepting redundant method calls could be that a user was not concerned about performance of the associated method, for any of a number of reasons. Source code annotations could be provided for use in carrying out this step.

If it is determined that there is an acceptable reason for the particular method to be redundant, the method call is disregarded, as shown by step 408. Otherwise, information pertaining to the redundancy of the particular method call is routed to software developers or other investigators, in accordance with step 412. Developers or others can then search for the cause of redundancy and correct it, or take other appropriate action. Following step 412, the procedure of FIG. 4 is ended.

With reference to FIG. 5, a block diagram of a data processing system is shown in which aspects of the present invention may be implemented. Data processing system 500 may for example be used as the data processing system 102 shown in FIG. 1, and is an example of a computer, in which computer usable code or instructions implementing the processes for embodiments of the present invention may be located.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 204. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash binary input/output system (BIOS).

HDD 226 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506 and coordinates and provides control of various components within data processing system 500 in FIG. 5. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 500 (Java is a trademark of Sun Microsystems, Inc. in the United States, other countries, or both).

As a server, data processing system 500 may be, for example, an IBM® eServer™ System p computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for embodiments of the present invention are performed by processing unit 506 using computer usable program code, which may be located in a memory such as, for example, main memory 508, ROM 524, or in one or more peripheral devices 526 and 530.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a program disposed to run on a data processing system, wherein the program is provided with one or more methods that can be selectively called when the program is running, a process comprising the steps of:
   collecting specified data each time that a call to a given one of the methods occurs, wherein a given call to the given method is associated with a set of arguments comprising one or more particular argument values for the given method, and said collected data includes an element uniquely identifying each of said particular argument values, the uniquely identifying element comprising a hash code for each of said particular argument values;
   storing said collected data at a selected location;
   selecting a call threshold for said given method, wherein said call threshold comprises a specified number of occurrences of said given call to said given method, when said program is running; and
   selectively analyzing said collected data at said storage location, to determine whether an occurrence of said given call to said given method has exceeded said call threshold.

2. The process of claim 1, wherein:
   responsive to determining that an occurrence of said given call to said method has exceeded said threshold, determining whether or not said given call is a redundant call.

3. The process of claim 2, wherein:
determining whether or not said given call is a redundant call includes determining whether or not said given method has side effects.

4. The process of claim 2, wherein:
responsive to determining that said given call is a redundant call, selectively investigating the cause of redundancy.

5. The process of claim 1, wherein:
responsive to each occurrence of said given call to said given method, an entry for said given call is inserted into a data table at said storage location, wherein the entry comprises at least a portion of said collected data, and includes the name of said given method, and the hash code for each of said particular argument value of said argument set.

6. The process of claim 5, wherein:
said analyzing step includes counting the number of said entries for said given call in said data table, and further includes determining whether said counted number exceeds said call threshold.

7. The process of claim 1, wherein:
said step of selecting a call threshold for said given method includes evaluating the comparative expense of said given call to said method.

8. The process of claim 7, wherein:
evaluating the comparative expense of said given call to said method includes evaluating a metric representing at least one of the execution time, the CPU capacity and the memory capacity that is required by an occurrence of said given call to said method.

9. The process of claim 1, wherein:
a profile is used in collecting said specified data.

10. In association with a program disposed to run on a data processing system, wherein the program is provided with one or more methods that can be selectively called when the program is running, a computer program product stored and executable in a non-transitory computer readable storage medium comprising:
instructions for collecting specified data each time that a call to a given one of the methods occurs, wherein a given call to the given method is associated with a set of arguments comprising one or more particular argument values for the given method, and said collected data includes an element uniquely identifying each of said particular argument values, the uniquely identifying element comprising a hash code for each of said particular argument values;
instructions for storing said collected data at a selected location;
instructions for selecting a call threshold for said given method, wherein said call threshold comprises a specified number of occurrences of said given call to said given method, when said program is running; and
instructions for selectively analyzing said collected data at said storage location, to determine whether an occurrence of said given call to said given method has exceeded said call threshold.

11. The computer program product of claim 10, wherein:
responsive to determining that an occurrence of said given call to said method has exceeded said threshold, determining whether or not said given call is a redundant call.

12. The computer program product of claim 10, wherein:
responsive to each occurrence of said given call to said given method, an entry for said given call is inserted into a data table at said storage location, wherein the entry comprises at least a portion of said collected data, and includes the name of said given method, and the hash code for each of said particular argument value of said argument set.

13. The computer program product of claim 12, wherein:
said analyzing step includes counting the number of said entries for said given call in said data table, and further includes determining whether said counted number exceeds said call threshold.

14. In association with a program disposed to run on a data processing system, wherein the program is provided with one or more methods that can be selectively called when the program is running, an apparatus including one or more processors comprising:
a device for collecting specified data each time that a call to a given one of the methods occurs, wherein a given call to the given method is associated with a set of arguments comprising one or more particular argument values for the given method, and said collected data includes an element uniquely identifying each of said particular argument values, the uniquely identifying element comprising a hash code for each of said particular argument values;
a device for collecting storing said collected data at a selected location;
a device for collecting selecting a call threshold for said given method, wherein said call threshold comprises a specified number of occurrences of said given call to said given method, when said program is running; and
a device for collecting selectively analyzing said collected data at said storage location, to determine whether an occurrence of said given call to said given method has exceeded said call threshold.

15. The apparatus of claim 14, wherein:
said apparatus includes a device responsive to determining that an occurrence of said given call to said method has exceeded said threshold, for determining whether or not said given call is a redundant call.

16. The apparatus of claim 14, wherein:
said apparatus includes a device responsive to each occurrence of said given call to said given method, an entry for said given call is inserted into a data table at said storage location, wherein the entry comprises at least a portion of said collected data, and includes the name of said given method, and the hash code for each of said particular argument value of said argument set.

17. The apparatus of claim 16, wherein:
said analyzing device is adapted to count the number of said entries for said given call in said data table, and to determine whether said counted number exceeds said call threshold.

* * * * *